United States Patent [19]

Takeuchi

[11] Patent Number: 4,854,358
[45] Date of Patent: Aug. 8, 1989

[54] TREAD PATTERN FOR A HEAVY LOAD PNEUMATIC TIRE WHICH CHANGES FROM A BLOCK PATTERN TO A RIB PATTERN WITH WEAR

[75] Inventor: Akihiro Takeuchi, Hyogo, Japan

[73] Assignee: Sumitomo Rubber Industries, Ltd., Japan

[21] Appl. No.: 53,532

[22] Filed: May 22, 1987

Related U.S. Application Data

[63] Continuation of Ser. No. 748,904, Jun. 26, 1985, abandoned.

[51] Int. Cl.$^4$ ............................................. B60C 11/06
[52] U.S. Cl. ............................................. 152/209 R
[58] Field of Search ........................ 152/209 R, 209 D

[56] References Cited

U.S. PATENT DOCUMENTS

| | | | |
|---|---|---|---|
| 3,055,410 | 9/1962 | Caulkins | 152/209 R |
| 3,664,402 | 5/1972 | Montagne | 152/209 R |
| 3,698,462 | 10/1972 | Jacobs | 152/209 R |
| 3,707,177 | 12/1972 | Boileau | 152/209 R |
| 3,951,193 | 4/1976 | Yeager | 152/209 R |
| 4,217,942 | 8/1980 | Takigawa et al. | 152/209 R |
| 4,223,712 | 9/1980 | Iwata et al. | 152/209 D |
| 4,258,691 | 3/1981 | Nakayama | 152/209 R |
| 4,271,885 | 6/1981 | Takigawa et al. | 152/209 R |
| 4,412,575 | 11/1983 | Maeda et al. | 152/209 R |
| 4,423,760 | 1/1984 | Treves et al. | 152/209 R |
| 4,619,300 | 10/1986 | Tokunaga et al. | 152/209 R |

FOREIGN PATENT DOCUMENTS

| | | | |
|---|---|---|---|
| 2422707 | 5/1974 | Fed. Rep. of Germany | 152/209 R |
| 2838114 | 3/1979 | Fed. Rep. of Germany | 152/209 R |

Primary Examiner—Michael W. Ball
Assistant Examiner—Geoffrey L. Knable
Attorney, Agent, or Firm—Stevens, Davis, Miller & Mosher

[57] ABSTRACT

A tread pattern for a pneumatic tire having a plurality of circumferentially extending zig-zag and straight longitudinal grooves and a multiplicity of transverse grooves extending generally axially and joining the longitudinal grooves to define a block pattern.

The tread pattern will change from a block pattern to a rib pattern as it wears because the transvers groove extend to a shallower depth than the longitudinal grooves. The bottom of the longitudinal grooves, which are at a greater depth, preferably have a different zig-zag pattern than the part of the longitudinal groove which contact the road when the tire is new.

3 Claims, 5 Drawing Sheets

TREAD PATTERN FOR A HEAVY LOAD PNEUMATIC TIRE WHICH CHANGES FROM A BLOCK PATTERN TO A RIB PATTERN WITH WEAR

This application is a continuation of application Ser. No. 748,904, filed June 26, 1985, now abandoned.

BACKGROUND OF THE INVENTION

This invention relates to a heavy load pneumatic tire. More particularly, it is concerned with a block pattern formed on a tread by circumferentially extending longitudinal grooves and transverse grooves extending axially of the tire, and provides an all-season tread pattern having an improved groove depth and width which can be used at any time of the year throughout the winter and summer seasons.

A pneumatic tire usually has a tread pattern of the lug, rib, rib-lug, block, lug-block or rib-block type, depending on the use of the tire, seasonal factors, road conditions, etc.

For example, a tire of the rib type has a plurality of ribs defined by a plurality of circumferentially continuous grooves which divide a tread surface across its width. The tread pattern of such a rib tire makes it suitable mainly for traveling on a good road at a high speed. It has, therefore, been playing an important role as a tire for, for example, a highway bus, long-distance truck or sightseeing bus. The block pattern is composed of blocks of various shapes defined by a multiplicity of notches in a tread surface. The edges of the notches catch the road surface firmly, and enable a great improvement in coefficient of traction power and transverse sliding resistance. They serve only effectively for drainage purposes on a wet road, and exhibit an excellent wet grip and a high performance on snow.

By virtue of these features, a tire having a block tread pattern is particularly used during the rainy season or when it has snowed, replacing tires of other types whenever required.

The remarkable development which Japan has recently achieved in its highway network, however, has come to compel trucks or buses to travel over a greatly increased distance. Such a change in the mode of vehicle operation tends to bring about a greater variety of requirements for tires. As a single drive covers a long distance, it is likely that the vehicle may encounter many changes in weather and road conditions (the road may be a local one, a highway or an unpaved, snow-covered, frozen or wet one). There is, therefore, a strong demand, especially from the industry handling large trucks and buses, for a tire which enables a long time of continuous traveling, irrespective of any such changes in weather and road conditions.

SUMMARY OF THE INVENTION

In view of the new demands for tire performance, it is an ideal of the tire industry to provide a tire which satisfies the following conditions:

(1) A tire having a life which enables its use throughout the year (no necessity for tire exchange);

(2) A tire which ensures the safety of high speed traveling, even if it is raining (a good wet grip); and (3) A tire which ensures the safety of high speed traveling on a snow-covered road (high snow resistance).

If the conventional tires are considered in the light of these requirements, the tire having a rib pattern is not expected to show any satisfactory wet grip or snow resistance, as hereinbefore pointed out.

No life-enabling use throughout the year can be expected from a tire having a block pattern, since it has only a small effective tread area and gets worn quickly.

It is, therefore, an object of this invention to provide a tire which can be used throughout the year without change when its use is started during the snow season. In a tread pattern for a pneumatic tire having a tread formed with a plurality of circumferentially continuously extending zig-zag and straight longitudinal grooves and a multiplicity of transverse grooves extending axially of the tire and joining the longitudinal grooves, the longitudinal and transverse grooves defining a block pattern, this invention provides an improvement in which when tread rubber has worn out to the extent corresponding to 35-75% of the maximum depth of the longitudinal grooves, the transverse grooves disappear to form a rib pattern consisting solely of the longitudinal grooves. More specifically, the block pattern occupies a central tread portion having a width equal to at least 40-60% of the entire tread width when the tire is a new one, and the longitudinal grooves have a total width equal to 15-35% of the entire tread width when the tread is a new one, and 10-25% of the entire tread width when the tread has worn by 35-75%.

BRIEF DESCRIPTION OF THE DRAWINGS

The invention will now be described in further detail by way of example and not of limitation with reference to the drawings, in which:

FIG. 3 is a cross-section along line B—B;
FIG. 4 is a cross-section along line D—D;
FIG. 5 is a cross-section along line C—C;
FIG. 6 is a cross-section along line A—A;
FIG. 7 is a cross-section along line E—E;
FIG. 8 is a cross-section along line G—G;
FIG. 9 is a cross-section along line F—F;

DETAILED DESCRIPTION OF THE DRAWINGS

Figure 1:
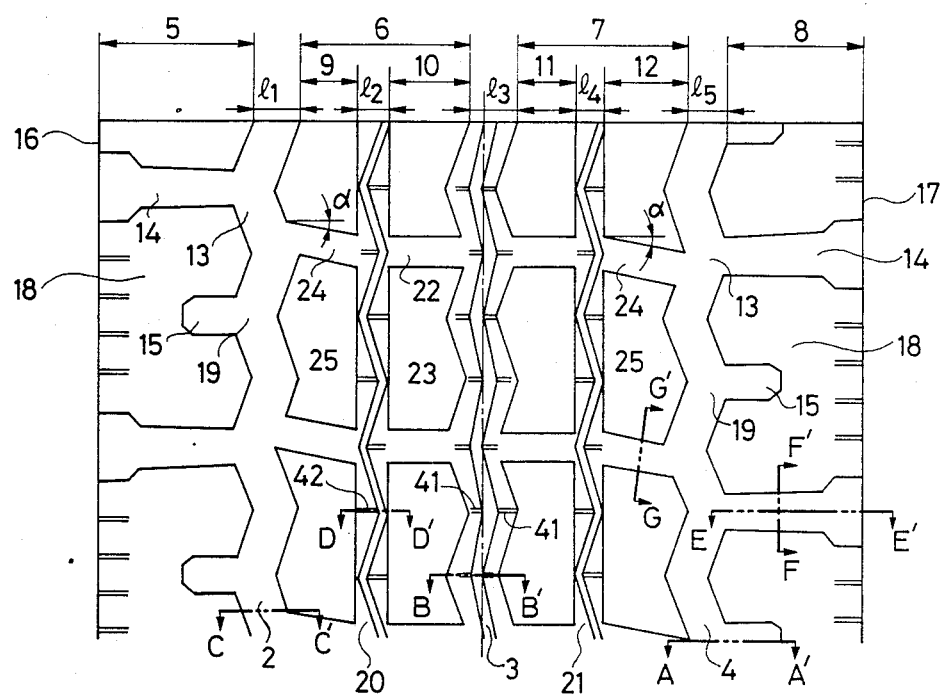
FIG. 1 is a developed plan view of a tire tread pattern embodying this invention.
Figure 3:
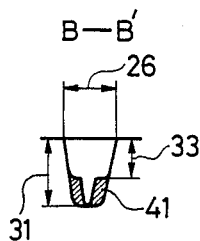
FIGS. 3-9 show the cross-sectional shape of the various longitudinal and transverse grooves of FIG. 1 as follows.
Figure 4:
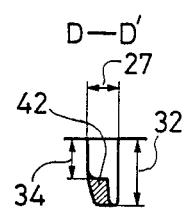
Figure 5:
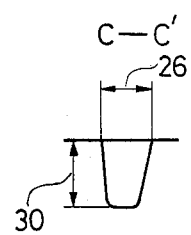

Turning now to the drawings in greater detail, FIG. 1 is a fragmentary top plan view of a tire tread embodying this invention. The tread has a longitudinal axis A, and is divided into four circumferentially extending areas 5-8 by three zig-zag longitudinal grooves 2-4 having a V-shaped cross-section, as shown in FIG. 5. The central longitudinal groove 3 is a stepped groove, as shown in FIG. 3, so that stones will not be readily caught therein. The central areas 6 and 7 are further divided into circumferentially extending areas 9-12 by straight longitudinal grooves 20 and 21 having a U- shaped cross-section, as shown in FIG. 4. The grooves 20 and 21 are both stepped, as shown in FIG. 4, so that stones will not be readily caught therein. Each of the outer areas 5 and 8 has a circumferentially continuous array of generally M-shaped shoulder blocks 18. Each block is defined by a pair of bolt-shaped transverse grooves 14, each having one end which opens in the longitudinal groove 2 or 4, while the other end thereof terminates at a tread edge 16 or 17. The shoulder blocks are divided from one another by zig-zag corners 13 which are spaced apart from one another by a distance equal to two pitches of the zig-zag grooves. Each of the longitudinal grooves 2 and 4 has a multiplicity of zig-zag corners 19. Each block 18 is formed with a transverse groove 15 having a U-shaped cross-section, and having one end which opens in the groove 2 or 4, while the other end thereof is closed. Each of the areas 10 and 11 on the opposite sides of the longitudinal axis A has a circumferentially continuous array of circumferentially elongated blocks 23. Each block 23 is defined by a pair of transverse grooves 22 having a U-shaped cross-section extending across the longitudinal groove 3 at right angles to the longitudinal axis A and having a pair of opposite ends opening in the straight longitudinal grooves 20 and 21. The grooves 22 are spaced apart from one another by a distance equal to 1.5 pitches of the zig-zag grooves.

Figure 8:
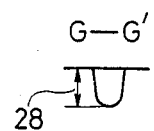

Each of the small areas 9 and 12 located outwardly of the straight longitudinal grooves 20 and 21, respectively, has a circumferential continuous array of circumferentially elongated blocks 25, each defined by a pair of inclined grooves 24 having a U-shaped cross-section, as shown in FIG. 8, and a pitch which is equal to the pitch of the transverse grooves 22, lying at an angle α to the tire axis, and communicating with the transverse grooves 22 through the straight grooves 20 and 21.

Thus, the central tread areas 6 and 7, which define an area of contact with the ground, have a total of four arrays of circumferentially elongated blocks defining a network of grooves, which enables the tread to effectively push away water and snow, having a small depth and thus better able to catch the road surface. In order to achieve these results most effectively, the network of grooves is provided in an area occupying 40–60% of the entire tread width (TW), and according to the specific example herein described, occupying 54% thereof. In order to satisfy both of the tread life and wet grip requirements, it is more appropriate to design such a block area defined by the groove network with a width which is equal to 40–60% of the tread width. If the width of the block area exceeds 60% of the tread width, the wear resistance of the tread is reduced, although it shows a high wet grip effect. On the other hand, if the width of the block area is smaller than 40%, the tread has a poor wet grip effect, although its wear resistance is high. This is, of course, a factor which depends on the proportion of the effective tread area. The inventor of this invention has made many tests and found that the most appropriate width of the areas 6 and 7 defining the block pattern is in the range of 40–60% of the entire tread width TW. According to the specific example herein described, each of the zig-zag grooves 2–4 has a width of 12 mm, as measured on the outermost surface of the tread (as indicated at 26 in FIG. 2), and each of the straight longitudinal grooves 20 and 21 has a width of 7 mm, as likewise measured (as indicated at 27 in FIG. 4). Thus, the grooves have a total width ($L = l_1 + l_2 + l_3 + l_4 + l_5$) of 50 mm, which occupies 25% of the tread width TW of 200 mm. If the value of L/TW exceeds 35%, the tire has a poor wet grip effect due to a lower rigidity of the blocks and a higher possibility of block deformation, resulting in a reduction in the drainage effect of the grooves, and also a shorter life as an increase in block movement accelerates the wear of tread rubber. If the value is less than 15%, the inventor has experimentally found that the tire is inferior in wet grip property, transverse sliding resistance and traction capacity, as the groove width is so small that the tread does not effectively drain water and catch the road surface, although the blocks are high in rigidity and stable against deformation. Therefore, it is appropriate for the longitudinal grooves to have a total width which is equal to 15–35% of the tread width when the tire is a new one.

Figure 6:
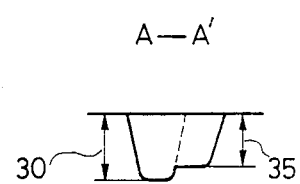
Figure 7:
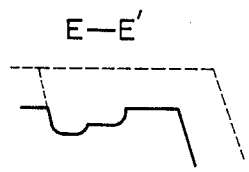
Figure 9:
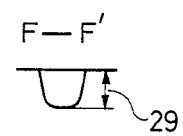
Figure 2:
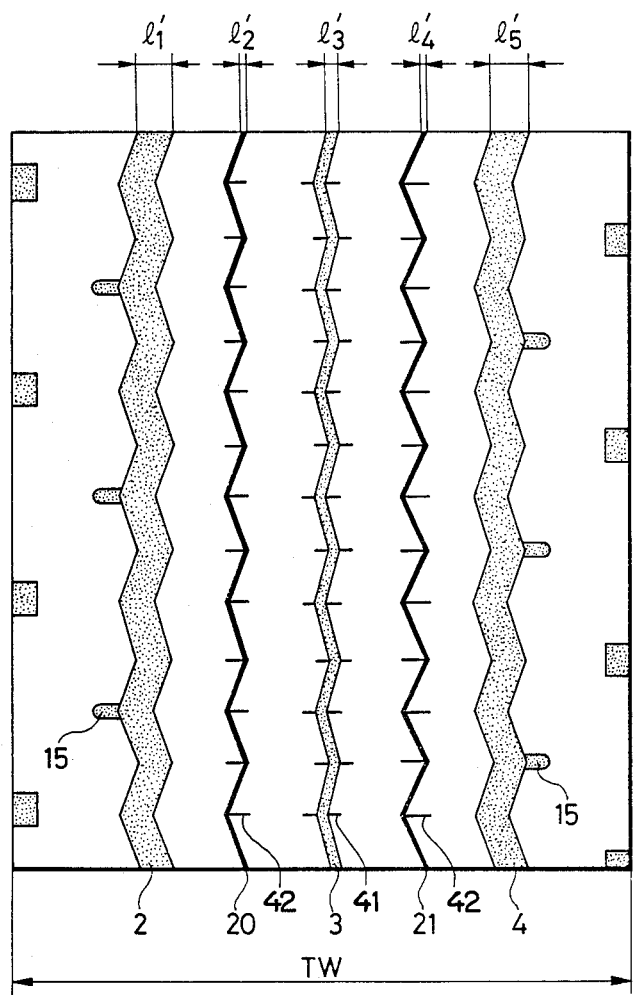
FIG. 2 is a plan view showing the tire of FIG. 1 after tread wear has caused conversion to a rib pattern.

The transverse grooves 22, the inclined grooves 24 and the bolt-shaped transverse grooves 14 adjacent to the opposite edges of the tread are all 10 mm in depth (as indicated at 28 in FIG. 8 and at 29 in FIG. 9). The zig-zag longitudinal grooves 2 and 4 are V-shaped in cross-section, as shown in FIG. 5, and have a depth 30 of 18 mm. The central groove 3 is stepped in cross-section, as shown in FIG. 3, so that stones will not be readily caught therein. It has a depth 31 of 18 mm, and includes an outer portion having a depth 33 of 10 mm. The wall of the groove is formed at each corner of its inner portion with a notch 41 leading to the bottom of the groove. The straight longitudinal grooves 20 and 21 are also stepped in cross-section, as shown in FIG. 4, so that stones will not be readily caught therein. Each of the grooves 20 and 21 has a depth 32 of 17 mm, and includes an outer portion having a depth 34 of 10 mm. A notch 42 is formed at each zig-zag corner. Thus, all of the principal grooves 20, 3 and 21 are stepped in cross-section and include an outer portion having a depth of 10 mm, which is equal to the depth of the transverse grooves, and a narrower inner portion extending radially inwardly from said outer portion in stepped fashion and following a zig-zag path in the direction as shown in FIGS. 1–4. If the tread rubber is worn by a thickness of 10 mm, all of the transverse grooves 22, 24 and 14 and the outer portions of the longitidinal grooves 3, 20 and 21 therefore disappear, and the worn tread has a rib pattern, as shown in FIG. 2. The grooves 15 are, however, an exception. They have a depth 35 (FIG. 6) of 15 mm, which is 5 mm greater than that of the other transverse grooves, and still have a depth of 5 mm when 10 mm of the tread rubber has worn out.

According to the example herein described, therefore, the block pattern is converted to a rib pattern when the tread rubber has worn by a thickness of 10 mm, corresponding to 55% of the maximum depth of 18 mm of the longitudinal grooves. This percentage is, however, variable in the range of 35–75%, depending on the conditions under which the tire is used. A relatively high percentage within this range is selected for a tire which is used in a region having a long rainy or snowy season, while a relatively low percentage is chosen for a tire used in other regions. According to the example herein described, the longitudinal grooves 2, 20, 3, 21 and 4 on the worn tread surface, having a rib pattern, have a total width ($L' = l_1' + l_2' + l_3' + l_4' + l_5'$), which is equal to 12% of the tread width TW', as measured in parallel to the axis of the tire. This percentage is preferably in the range of 10–25%. A percentage below 10% is likely to present a problem, even if the tire is used on a dry road, since its traction capacity and transverse sliding resistance are extremely lowered. A percentage in excess of 25% results in a tire which gets worn very quickly and is difficult to use throughout the year.

Figure 10:
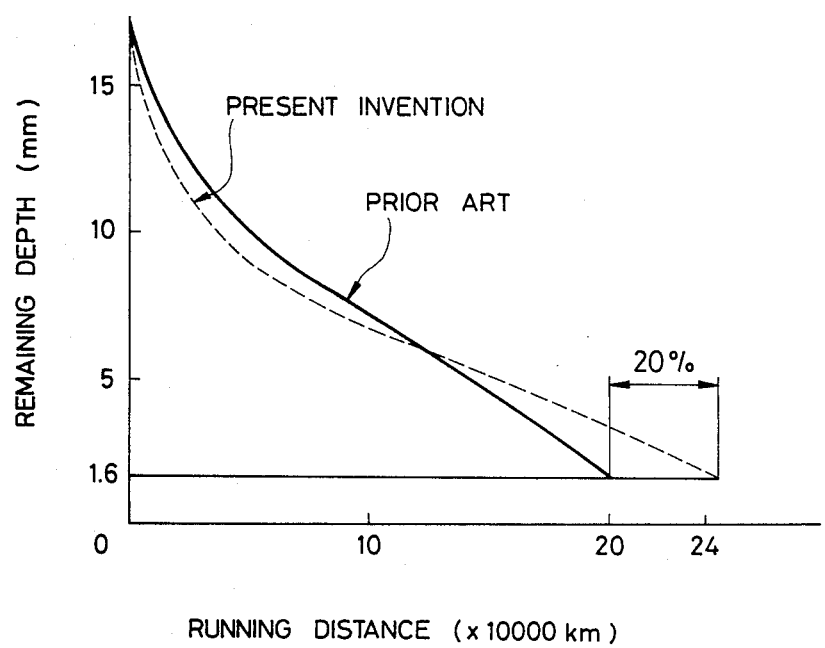
FIGS. 10-12 show the results of the tests conducted to compare the conventional block pattern and the pattern embodying this invention in respect of wear resistance, wet grip property and performance on snow.
Figure 11:
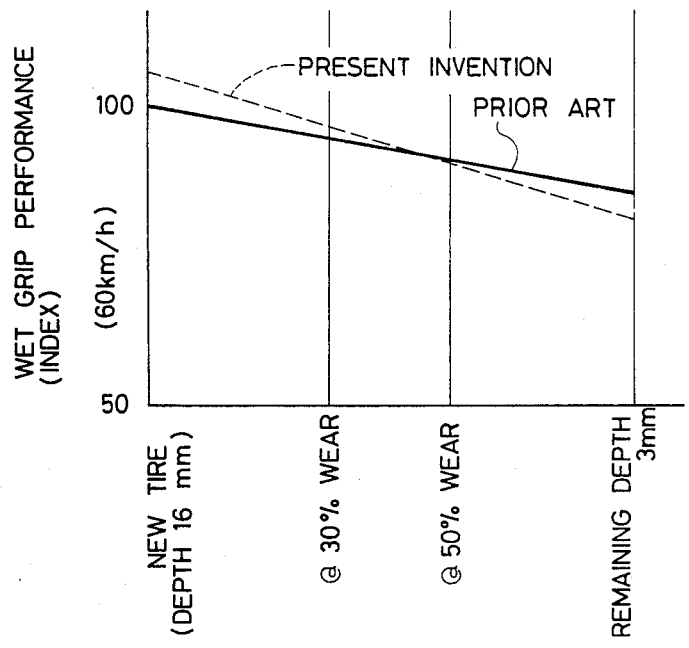
Figure 12:
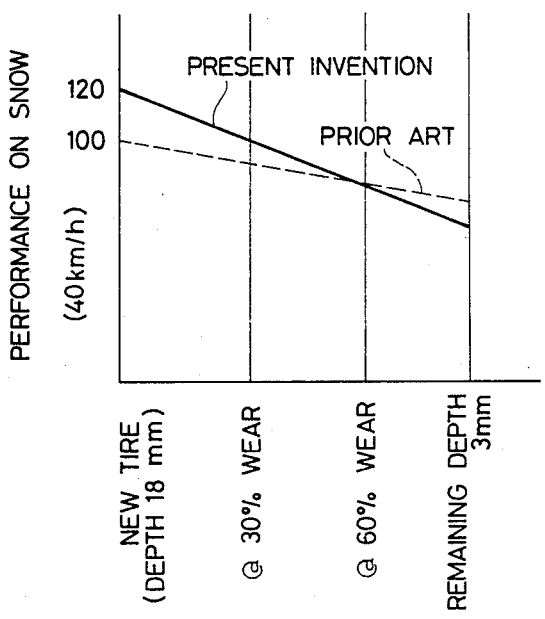

The tire embodying this invention, as hereinabove described, and a conventional tire having a block tread pattern where compared with each other in respect of wear resistance and grip properties on a wet road and a road covered with fresh snow. The results are shown in FIGS. 10 and 12, respectively. The size of each tire was 10.00 R20 14PR. Each tire has a pneumatic pressure of 7.25 kg/cm$^2$, and was subjected to a load of 2500 kg.

TABLE 1

Figure 13:
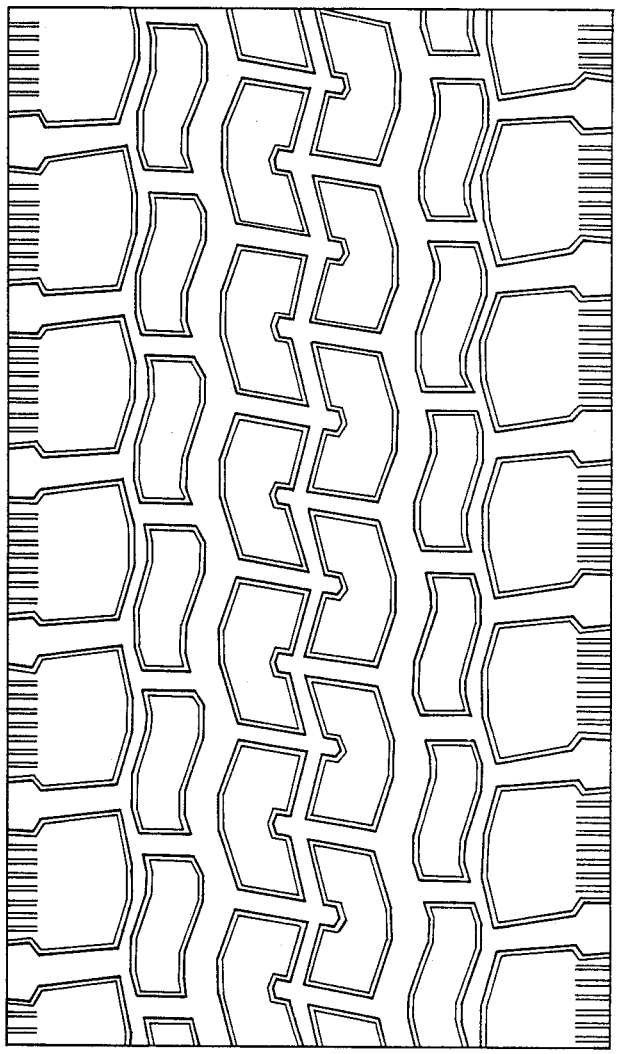
FIG. 13 is a developed view of a block pattern on a conventional tire tread.

|  | Tire Embodying This Invention | Conventional tire Having a Block Tread Pattern |
| --- | --- | --- |
| Tread width TW (mm) | 200 | 200 |
| Block pattern ratio (%) | 54 | 53 |
| Total groove width/tread width (%) on a new tire | 25 | 21 |
| Total groove width/tread width (%) on a 35–75% worn tire | 12 | — |
| Percentage of wear at which the tread pattern changed (%) | 55 | — |
| Tread pattern on the new tire | Shown in FIG. 1 | Shown in FIG. 13 |

The tests were conducted by mounting each tire on a 2 D—D vehicle. Its wear resistance was evaluated by the remaining depth of the zig-zag grooves in the center of the tread. Its grip capacity was examined by obtaining a coefficient of wear in a braking test. This value is shown by way of an index, as compared with the value of 100 on the conventional tire.

The test results indicate that the tire of this invention is superior in wet and snow grip properties until a wear of slightly over 50% converts its block tread pattern to a rib pattern, although it gets worn slightly faster, and thereafter shows a drastically improved wear resistance which improves the overall life of the tire by 20%.

What is claimed is:

1. A tread pattern for a pneumatic tire, comprising: a multi-depth tread with an unworn configuration having a plurality of circumferentially continuously extending longitudinal grooves having at least one zig-zag longitudinal groove and at least two straight longitudinal grooves and a multiplicity of transverse grooves extending generally axially of the tire and joining said longitudinal grooves to define a block pattern occupying 40 to 60% of the tread width when the tread is not worn;

the longitudinal grooves in said unworn configuration having an initial total width equal to 15 to 35% of the tread width and a total later width equal to 10 to 25% of the tread width when the tread has worn by 35 to 75%, said total widths of the longitudinal grooves being measured parallel to the axis of the tire;

each of the at least two straight longitudinal grooves having a straight longitudinal first width configuration extending radially inwardly only to a first depth and a second narrower width configuration being in a zig-zag pattern and extending radially inwardly in a stepped fashion from said first depth to a second depth, the at least one zig-zag longitudinal groove having a zig-zag longitudinal first width configuration extending radially inwardly only to a first depth and a second narrower width configuration also being of a zig-zag configuration extending radially inwardly in a stepped fashion from said first depth to said second depth;

said transverse grooves being in two groups, a majority group and a remainder group with said majority group having only a first depth, approximately equal to the first depth of the longitudinal grooves, and the grooves of said remainder group being open to an adjacent longitudinal groove at only one end and having both a first depth and a second depth, the arrangement being such that when the tread pattern wears by 35–75% down to the first depth then the grooves of said majority group will disappear to form a rib pattern and the straight portion of said at least two longitudinal straight grooves will also disappear so that the tread pattern will have visible only the second depth of the longitudinal grooves and the second depth of said remainder group of the transverse grooves.

2. The tread pattern of claim 1, in which at least some of the longitudinal grooves are V-shaped in cross-section.

3. The tread pattern of claim 1, in which at least some of the longitudinal grooves are U-shaped in cross-section.

* * * * *